Aug. 8, 1939.   L. R. LANKES ET AL   2,168,997
LIQUID APPLYING PAN
Filed Dec. 16, 1937

L. Richard Lankes
Gale F. Nadeau
INVENTORS

BY
ATTORNEYS

Patented Aug. 8, 1939

2,168,997

UNITED STATES PATENT OFFICE 2,168,997

LIQUID APPLYING PAN

Leonard Richard Lankes and Gale F. Nadeau, Rochester, N. Y., assignors to Eastman Kodak Company, Rochester, N. Y., a corporation of New Jersey Application December 16, 1937, Serial No. 180,186

8 Claims. (Cl. 91—10)

The present invention relates to a process for applying a thin coat of liquid to a strip of sheet material, and more specifically to a subbing pan into which a photographic film base is dipped to apply a subbing layer to the base. It is contemplated, however, that this pan construction is adapted to a wide variety of uses, and the applicant is, therefore, not to be limited except in so far as is necessitated by the prior art and the scope of the appended claims.

One object of the invention is the provision of a pan of this class which insures substantial uniformity of the liquid viscosity, thus eliminating "flow" line in the liquid.

Another object of the invention is the provision of such a pan which materially reduces the "dead" spaces therein.

A further object of the invention is the provision of a pan to which the liquid material is uniformly supplied for the full length thereof.

A still further object of the invention is the provision of a pan of the class described which assures nearly uniform draw-off of the liquid for the full length of the pan.

Yet another object of the invention is the provision of a pan of this class which is extremely simple in construction, relatively inexpensive to manufacture, and highly effective in use.

To these and other ends, the invention resides in certain improvements and combinations of parts, all as will be hereinafter more fully described, the novel features being pointed out in the claims at the end of the specification.

In the drawing.

Similar reference numerals throughout the various views indicate the same parts.

Figure 1:
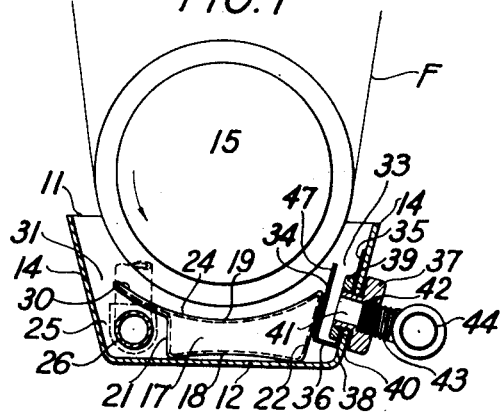
Fig. 1 is a vertical sectional view through a subbing pan constructed in accordance with the preferred embodiment of the invention, showing the relation of the subbing roll thereto.

In the manufacture of photographic film, a film base or support is first formed, and this support is then coated with a suitable subbing layer prior to the application of the light sensitive emulsion. This subbing may be applied, for example, by passing a strip of film support over a roll which dips into a pan containing the subbing material.

One of the chief difficulties with the usual type of pan for subbing applications is that they are often sources of longitudinal lines running along the length of the support to which the sub is being applied. These lines are caused by "flow" lines in the pan itself which, in turn, are due to fresh sub of one viscosity flowing in and not mixing uniformly or immediately with the sub of another viscosity in the pan. Furthermore, the design of such a pan does not permit uniform entry of the fresh sub all along the length of the pan, and does not permit uniform draw-off along the length thereof. In addition, considerable "dead" space is present where the sub supply is more or less idle, the sub becoming more stagnant as time goes on due to temperature changes or the evaporation of the solvents as is apparent to those in the art.

In order to overcome these difficulties, the present invention provides a pan which is formed with a shallow conduit or channel through which the subbing material is constantly flowing, and into which the subbing roll dips to apply the material to the film support. Such subbing material is continuously and uniformly fed to one side of this conduit along the full length thereof, and the excess of subbing material is continually drawn off along the opposite edge of the conduit. By means of this arrangement, a continuous flow of fresh subbing material of substantially uniform viscosity passes through the conduit, thus eliminating the "flow" lines and "dead" spaces. In addition, the draw-off controls and maintains the level of the subbing material in the conduit.

A subbing pan constructed in accordance with the present invention is illustrated in the accompanying drawing. This pan, generally indicated by the numeral 11, is formed of any suitable material, preferably sheet metal, to provide a bottom 12, end wall 13, and sloping side walls 14. The film strip F, which is to be coated with a subbing layer, is fed from any suitable source, not shown, and passed under the subbing roll 15 which dips into the pan 11, as clearly illustrated in Fig. 1. The pan has a length slightly greater than the width of the roll 15, as is well known.

Figure 2:
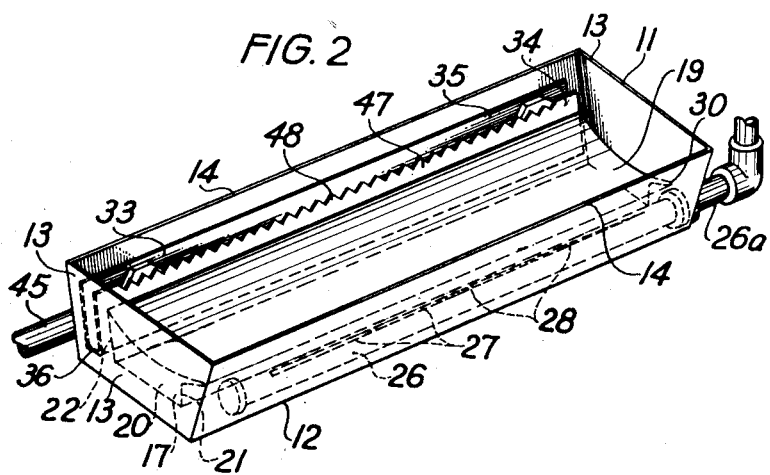
Fig. 2 is a perspective view of a preferred form of subbing pan with the subbing roll removed for purposes of clearness, showing the relation of the various parts of the pan.

In order to materially reduce the "dead" spaces, the present invention provides a false bottom member, generally indicated by the numeral 17, positioned within the pan 11, as clearly shown in Figs. 1 and 2. The member 17 may be formed of any suitable material to provide a lower surface 18, a curved top 19, substantially parallel ends 20, and opposite sides 21 and 22. The member 17 extends the full length of the pan 11 so that the ends 20 engage the end walls 13 of the pan 11, as clearly illustrated in Fig. 2. This false bottom is suitably weighted or secured so as to rest on the bottom 11, as shown in Fig. 1.

The curved or arcuate top 19 is arranged adjacent and substantially concentric with the subbing roll 15 to provide a long shallow conduit 24 through which the subbing material flows in a thin stream. As the quantity of the material in the conduit 24 is relatively small, and is constantly replenished, as hereinafter described, the viscosity of the material therein is, therefore, substantially uniform. Furthermore, as this shallow channel extends the full length of the pan, the flow lines are practically eliminated, as will be readily apparent to those in the art.

Figure 3:
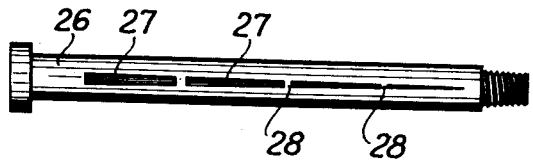
Fig. 3 is a longitudinal view of the feed-in or supply pipe.

Fresh subbing material is continuously supplied to the shallow conduit 24 from a supply chamber 25 arranged along one edge of the conduit and formed between the side 21 of the false bottom 17 and the adjacent side wall 14 of the pan 11, as clearly shown in Fig. 1. This subbing material is delivered to the chamber 25 through a feed-in or supply pipe 26 which extends substantially the full length of the chamber 25, and projects through an end wall 13 of the pan 11 where it is connected through a pipe 26ª to a source supply, not shown. In order to insure nearly uniform influx of the fresh subbing material the full length of the chamber 25, the supply pipe 26 is provided with a longitudinally extending tapered discharge slot 27, see Fig. 3, the narrow end of the slot being at the inlet end, for reasons well known. The degree of taper of the discharge slot 27 is determined approximately by the expected drop in hydrostatic head along the length of the pipe 26. The slot 27 is bridged in several places by means of cross pieces 28 so as to retain sufficient strength for the pipe so that the latter will maintain its shape in the normal course of handling.

To secure a thorough mixing and uniform viscosity of the subbing material prior to the passing thereof into the conduit 24, the false bottom 14 is preferably formed with a laterally extending baffle 30 which forms a continuation of the curved top 19 and overlies the supply pipe 26, all of which is clearly illustrated in Fig. 1. The subbing material then passes out from in under the baffle 30 through the opening 31 between the baffle and the side of the pan, and then through the conduit 24 where it is applied to the strip F.

The excess subbing material is drawn off the opposite side of the conduit 24 through an open draw-off channel, generally indicated by the numeral 33, positioned between the substantially parallel sides 22 and 14 of the member 17 and pan 11 respectively. The channel 22 is U-shaped in cross section, and is formed to provide spaced members 34 and 35, and a bottom connecting member 36. The member 35 is clamped to and supported by the side wall 14 and the pan 11 by means of outlet fittings, each of which comprises an enlarged head 37, and a threaded shank 38 which extends through registering openings formed in the members 35 and adjacent side wall 14. The threaded portion 38 is arranged to receive a nut 39 by which the outlet fitting may be drawn up to securely clamp the member 35, and hence the draw-off channel 33, to the side wall 14 of the pan 11, as clearly shown in Fig. 1. A gasket 40 of asbestos, or other suitable material, is placed under the head 37 to provide a liquid tight connection. Each outlet fitting is formed with an axial opening 41, the outer end 42 of which is threaded to receive the threaded end 43 of a street L or T 44 which in turn is connected to a discharge pipe 45 which conveys the excess subbing material to a suitable point.

The member 34 of the channel 33 projects above the top 19 of the false bottom 17, and the top 47 thereof affords an overflow edge or spillway by which the excess subbing material is automatically and continuously discharged from the conduit 24 to the draw-off channel 33. This overflow edge is positioned at the liquid level normally used, and controls and maintains its level as long as fresh subbing material is supplied through the supply pipe 26. In order to overcome any surface tension which would tend to make the overflow all run toward one end of the pan in case the latter is not perfectly level, the top edge 47 is preferably serrated, as shown at 48 Fig. 2. The discharge openings 41 are made of such size as to maintain the liquid level in the draw-up channel 33 below the saw tooth of serrated spillway 48.

It is apparent from the above description that the subbing material flows in a long shallow stream through the conduit 34. As the supply of material in this conduit is being continuously replenished by means of the supply pipe, which furnishes material in excess of that actually taken up by the strip, the viscosity of the material in the conduit 24 is, therefore, maintained substantially uniform, thus eliminating the undesirable "flow" line. Furthermore, the level of the material in the conduit 24 is automatically maintained at a constant level by means of the serrated overflow edge 48. In addition, as the conduit 24 and draw-off channel 33 extend the full length of the pan, the "dead" spaces are thus obviously eliminated.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention and the scope of the appended claims.

We claim:

1. A pan of the class described, comprising, in combination, a bottom, a liquid supply chamber positioned along one side of said bottom and extending below the latter, means for continuously and uniformly supplying liquid to said chamber for the full length thereof, and a draw-off arranged along the other side of said bottom and positioned slightly above the latter to maintain a shallow layer of liquid on said bottom.

2. A pan of the class described, comprising, in combination, a bottom, a liquid supply chamber positioned along one side of said bottom and extending below the latter, a supply pipe positioned in said chamber for continuously and uniformly supplying liquid to said chamber for substantially the full length thereof, means on said bottom for obstructing the flow of liquid from said chamber to insure thorough mixing of the liquid therein, and a draw-off arranged along the other side of said bottom and positioned slightly above the latter to maintain a shallow layer of liquid on said bottom.

3. A pan of the class described, comprising, in combination, a bottom, a narrow liquid supply chamber positioned along one side of said bottom and extending substantially the full length thereof, a baffle on said bottom extending over said chamber, a supply pipe positioned in said chamber and beneath said baffle, said pipe being formed with a tapered slot for continuously and uniformly supplying liquid substantially the full length of said pan, a draw-off channel extending along the opposite edge of said bottom, and a side of said channel extending above said bottom to maintain a shallow layer of liquid on said bottom, said side having the upper edge thereof serrated to uniformly draw-off said liquid for the full length of said pan.

4. In an apparatus of the class described, the combination with a roll over which a strip of sheet material is guided, of a pan formed with a bottom positioned adjacent said roll to provide a shallow liquid conduit between said roll and said bottom, a liquid supply chamber extending substantially the full length of said bottom to continuously supply liquid to said conduit, for the full length thereof, a draw-off extending along the opposite side of said bottom for substantially the full length thereof, and an overflow edge on said draw-off positioned above said bottom to control the liquid level in said conduit.

5. In an apparatus of the class described, the combination with a roll over which a strip of sheet material is guided, of a pan formed with a curved bottom positioned adjacent said roll and substantially concentric therewith to provide a thin liquid conduit between said roll and said bottom through which said strip may be moved to apply a liquid coating thereon, a narrow liquid supply chamber arranged along one side of said conduit and extending below and in liquid communication with the latter, a liquid supply pipe positioned in said chamber and extending substantially the full length thereof, said pipe being formed with a tapered slot for uniformly distributing said liquid along said chamber, and means for maintaining the liquid level in and for uniformly drawing off the liquid from said conduit for the full length thereof.

6. In an apparatus of the class described, the combination with a roll over which a strip of sheet material is guided, of a pan formed with a curved bottom positioned adjacent said roll and substantially concentric therewith to provide a thin liquid conduit between said roll and said bottom through which said strip may be moved to apply a liquid coating thereon, a narrow liquid supply chamber arranged along one side of said conduit and extending below and in liquid communication with the latter, a baffle on said bottom extending across the top of said chamber and substantially the full length thereof to restrict the flow therefrom to insure proper mixing of the liquid in said chamber, a liquid supply pipe positioned in said chamber under said baffle, said pipe extending substantially the full length of said chamber and being found with a tapered opening for uniformly distributing the liquid along said chamber, a draw-off channel arranged along the opposite edge of said conduit to draw the liquid therefrom, and a serrated overflow edge on said draw-off channel arranged along the opposite side of said conduit to control the flow therefrom and the liquid level therein.

7. In an apparatus of the class described, the combination with a roll over which a strip of sheet material is guided, of a liquid applying pan into which said roll dips to apply a liquid coating to said strip, said pan comprising a bottom and sides, a member positioned in said pan and supported by said bottom, said member having a portion thereof arranged adjacent said roll to provide a thin liquid conduit through which said strip is moved, a supply chamber positioned between said member and one of said sides, a supply pipe positioned in said chamber for uniformly distributing liquid thereto, a draw-off channel adjacent another of said sides, and an overflow edge on said channel positioned above said portion to uniformly draw the liquid from said conduit and to control the liquid level therein.

8. In an apparatus of the class described, the combination with a roll over which a strip of sheet material is guided, of a liquid applying pan into which said roll dips to apply a liquid coating to said strip, said pan comprising a bottom, sides, and ends, a separate rectangular member supported on said bottom and extending the full length thereof and spaced from said sides, a top on said member positioned adjacent said roll and concentric therewith to provide a thin liquid conduit through which said strip is moved, a baffle integral with said member and projecting radially therefrom toward one of said sides, a supply pipe positioned between said member and said one side and below said baffle, said pipe being formed with a tapered longitudinal slot for continuously and uniformly supplying liquid to said conduit for the full width thereof, a draw-off channel positioned between said member and the other of said sides, and a notched overflow edge adjacent said member and positioned above said top to draw the liquid from and to control level thereof in said conduit.

LEONARD RICHARD LANKES.
GALE F. NADEAU.